United States Patent Office 3,067,264
Patented Dec. 4, 1962

3,067,264
FLUORINATED PENTADIENE
Kazimiera L. Paciorek, Trenton, Mich., assignor to Wyandotte Chemicals Corporation, Wyandotte, Mich., a corporation of Michigan
No Drawing. Filed Jan. 19, 1961, Ser. No. 83,639
1 Claim. (Cl. 260—653.3)

This invention relates to partially and totally fluorinated 1,4-pentadiene.

The compositions of the invention conform to the formula:

$$\underset{F}{\overset{F}{C}}=\underset{}{\overset{R^1}{C}}-\underset{F}{\overset{F}{C}}-\underset{}{\overset{R^2}{C}}=\underset{F}{\overset{F}{C}}$$

wherein $R^1$ and $R^2$ are members selected from the group consisting of hydrogen and fluorine, providing, however, that $R^1$ and $R^2$ are the same. Thus, the compositions of the invention are 1,1,3,3,5,5-hexafluoro-1,4-pentadiene according to the formula:

$$\underset{F}{\overset{F}{C}}=\underset{}{\overset{H}{C}}-\underset{F}{\overset{F}{C}}-\underset{}{\overset{H}{C}}=\underset{F}{\overset{F}{C}}$$

and 1,1,2,3,3,4,5,5-octafluoro-1,4-pentadiene according to the formula:

$$\underset{F}{\overset{F}{C}}=\underset{}{\overset{F}{C}}-\underset{F}{\overset{F}{C}}-\underset{}{\overset{F}{C}}=\underset{F}{\overset{F}{C}}$$

The aforementioned compositions are particularly useful in the preparation of copolymers and are readily copolymerizable with such monomers as vinyl chloride, vinyl acetate, acrylic acid esters, butadiene, styrene and the like. Elastomeric products prepared from these copolymers have improved heat stability.

Also, the fluorinated 1,4-pentadienes readily react with polyols, polythiols or polyamines in the presence of a base to form addition polymers.

For example, an addition polymer having the following recurring structural unit

{O—CH₂—CH₂—O—CF₂—CH₂—CF₂
—CH₂—CF₂—O—CH₂—CH₂—O} is prepared by reacting 1,1,3,3,5,5-hexafluoro-1,4-pentadiene with ethylene glycol in the presence of caustic soda in a closed vessel at a temperature of about 100° C.

To prepare hexafluoropentadiene, dibromodifluoromethane is reacted with vinylidene fluoride in about stoichiometric proportions in an autoclave at a temperature from about 80° to 100° C. and in the presence of a catalyst such as benzoyl peroxide to obtain 1,1,3,3,5,5-hexafluoro-1,5-dibromopentane; the latter composition is distilled from the reaction mixture and is collected as the fraction distilling over at 54° C. at 14 mm. of mercury pressure; an alkali metal hydroxide or a tertiary amine such as diethylcyclohexylamine is added to the distillate in ratio of at least 2 mols of base per mol of bromofluoropentane. The mixture is heated in a distillation apparatus and the fraction distilling over at 46° C. is hexafluoropentadiene. The reaction between the base and bromofluoropentane can be carried out in the presence of a solvent such as diglyme.

This process is illustrated graphically as follows:

$CF_2Br_2$ + $CH_2=CF_2$ →(Benzoyl peroxide, 80°–100° C.) Reaction mixture

Difluorodibromo-   Vinylidene
methane            fluoride        Autoclave   Distilled 54° C. at 14 mm.

$BrCF_2CH_2CF_2CH_2CF_2Br$ ←

1,1,3,3,5,5-hexafluoro-1,5-dibromopentane $BrCF_2CH_2CF_2CH_2CF_2Br$ + $C_6H_{11}N(C_2H_5)_2$ ⎤
                            Diethylcyclo-       150°–175° C.
                            hexylamine          atmos. pressure $CF_2=CH-CF_2-CH=CF_2$ ←

1,1,3,3,5,5-hexafluoro-1,4-    Collect distillate
pentadiene                     at 46° C.

Octafluoropentadiene is prepared in a manner analogous to that set forth above except that 1,2,2-trifluoroethylene is used as an initial reactant in lieu of vinylidene fluoride. This process is illustrated graphically as follows:

$CF_2Br_2$ + $CHF=CF_2$ →(Benzoyl peroxide, 80°–100° C.) Reaction mixture 1,2,2-trifluoro-
ethylene         Autoclave    Distilled 62° C. at 25 mm.

$BrCF_2CHFCF_2CHFCF_2Br$ ←

Octafluoro-1,5-dibromopentane $BrCF_2CHFCF_2CHFCF_2Br$ + $C_6H_{11}N(C_2H_5)_2$ ⎤
                                            Heat atmos. pressure $CF_2=CF-CF_2-CF=CF_2$ ←

Perfluorinated-1,4-pentadiene    Collect distillate at 25°–30° C.

The following example further illustrates a method for preparing the compositions of the invention.

*Example I*

To a 100 ml. round bottom flask equipped with a distilling column, packed with glass helices, there was added 25 ml. of diglyme followed by 7.7 grams of 1,1,3,3,5,5-hexafluoro-1,5-dibromopentane and 7.7 grams of diethylcyclohexylamine. The solution was heated and the fraction distilling over at 46° to 47° C. was collected. The distillate was identified by elemental analysis and infrared spectrum as being 1,1,3,3,5,5-hexafluoro-1,4-pentadiene. 3.3 grams of product were collected and the yield, based upon the bromide ion formed, was 87%. The refractive index and elemental analysis for the fluorinated pentadiene distillate are set forth below.

Refractive index: $N_D^2$ 1.3210
Elemental analysis for $C_5F_6H_2$:
    Calculated—Carbon 34.09%; fluorine 64.77%; hydrogen 1.14%
    Found—Carbon 33.68%; fluorine 64.29%; hydrogen 2.03%

What is claimed is:
1,1,3,3,5,5-hexafluoro-1,4-pentadiene according to the formula:

$$\underset{F}{\overset{F}{C}}=\underset{}{\overset{H}{C}}-\underset{F}{\overset{F}{C}}-\underset{}{\overset{H}{C}}=\underset{F}{\overset{F}{C}}$$

References Cited in the file of this patent
UNITED STATES PATENTS
2,833,831   Haszeldine _____ May 6, 1958
FOREIGN PATENTS
774,103   Great Britain _____ May 8, 1957